ＵＳ００９３３１９７６Ｂ２

United States Patent
Choi et al.

(10) Patent No.: US 9,331,976 B2
(45) Date of Patent: May 3, 2016

(54) METHOD OF REQUEST ROUTING RE-DIRECTION WITH LOOP DETECTION AND PREVENTION

(71) Applicants: ELECTRONICS AND TELECOMMUNICATIONS RESEARCH INSTITUTE, Daejeon (KR); Solbox Inc., Seoul (KR); SK TELECOM CO., LTD., Seoul (KR); LG Uplus Corporation, Seoul (KR)

(72) Inventors: Taesang Choi, Daejeon (KR); John Dongho Shinn, Seoul (KR); Jong Min Lee, Seoul (KR); Ja-Ryeong Koo, Seoul (KR)

(73) Assignees: ELECTRONICS AND TELECOMMUNICATIONS RESEARCH INSTITUTE, Daejeon (KR); LG Uplus Corporation, Seoul (KR); SK TELECOM CO., LTD, Seoul (KR); Solbox Inc., Seoul (KR)

( * ) Notice: Subject to any disclaimer, the term of this patent is extended or adjusted under 35 U.S.C. 154(b) by 263 days.

(21) Appl. No.: 14/080,874

(22) Filed: Nov. 15, 2013

(65) Prior Publication Data

US 2014/0156822 A1    Jun. 5, 2014

(30) Foreign Application Priority Data

Nov. 15, 2012   (KR) .................. 10-2012-0129733
Nov. 15, 2013   (KR) .................. 10-2013-0138901

(51) Int. Cl.
*G06F 15/16*    (2006.01)
*H04L 29/12*    (2006.01)
*H04L 29/08*    (2006.01)

(52) U.S. Cl.
CPC .......... *H04L 61/1511* (2013.01); *H04L 61/303* (2013.01); *H04L 67/289* (2013.01); *H04L 67/2842* (2013.01)

(58) Field of Classification Search
CPC ....... H04L 12/14; H04L 41/509; H04L 41/12; H04L 41/50; H04L 61/1511; H04L 67/2885; H04L 67/1097; H04L 65/80
USPC .................. 709/223, 218, 203, 238
See application file for complete search history.

(56) References Cited

U.S. PATENT DOCUMENTS

| | | | | |
|---|---|---|---|---|
| 7,822,871 B2* | 10/2010 | Stolorz | ............... | H04L 12/2602 709/202 |
| 8,199,752 B2* | 6/2012 | Swanson | ........... | H04L 29/08081 370/389 |
| 8,607,014 B2* | 12/2013 | Spatscheck | ........... | G06F 9/5083 709/224 |
| 8,909,736 B1* | 12/2014 | Bosch | ................. | H04L 67/1093 709/217 |
| 9,087,068 B1* | 7/2015 | Shah | ....................... | H04W 4/02 |
| 2002/0116481 A1* | 8/2002 | Lee | ......................... | H04L 29/06 709/220 |

(Continued)

*Primary Examiner* — David Lazaro
(74) *Attorney, Agent, or Firm* — LRK Patent Law Firm

(57) ABSTRACT

A method of request routing redirection includes: receiving, by a first content delivery network (CDN) among a plurality of CDNs connected by CDN interconnection (CDNi), a domain name system (DNS) request including a list of CDN-provider-identifications (IDs) of higher CDNs, from a client; determining whether the client's request is processable; and when the client's request is not processable, redirecting the request, while preventing a loop of the request routing on the basis of the list of the CDN-provider-IDs.

20 Claims, 8 Drawing Sheets

(56) References Cited

U.S. PATENT DOCUMENTS

| | | | | |
|---|---|---|---|---|
| 2003/0065762 A1* | 4/2003 | Stolorz | H04L 12/2602 | 709/223 |
| 2005/0010662 A1* | 1/2005 | Prabhakar | G06F 9/524 | 709/224 |
| 2008/0112390 A1* | 5/2008 | Kucmerowski | H04L 12/66 | 370/352 |
| 2010/0223364 A1* | 9/2010 | Wei | H04L 29/04 | 709/220 |
| 2011/0196943 A1 | 8/2011 | Bornstein et al. | | |
| 2011/0280153 A1* | 11/2011 | Li | H04L 12/14 | 370/254 |
| 2013/0094445 A1* | 4/2013 | De Foy | H04L 45/021 | 370/328 |

* cited by examiner

METHOD OF REQUEST ROUTING RE-DIRECTION WITH LOOP DETECTION AND PREVENTION

CROSS-REFERENCE TO RELATED APPLICATION

This application claims priority to and the benefit of Korean Patent Application Nos. 10-2012-0129733 and 10-2013-0138901 filed in the Korean Intellectual Property Office on Nov. 15, 2012 and Nov. 15, 2013, the entire contents of which are incorporated herein by reference.

BACKGROUND OF THE INVENTION (a) Field of the Invention

The present invention relates to a method of multi-location request routing redirection with loop detection and prevention in an environment in which content delivery networks are mutually connected.

(b) Description of the Related Art

A content delivery network (CDN) is a system that stores data in a network having a plurality of nodes in a distributed manner and provides the same to clients, to thus effectively transfer content. Recently, a method of preventing a loop in retransmitting request routing between CDNs in a case in which CDNs are connected in a single stage has been provided. That is, a solution to a case in which a single upstream CDN (uCDN) provider is directly connected to a level 1 downstream CDN (dCDN) provider is provided.

However, a plurality of CDN providers may be connected in multiple levels and topologies (trees, meshes, or the like) in the near future, and in this case, a technique of retransmitting cascaded request routing between CDNs and detecting and preventing a loop may be required. In the related art, however, only a single CDN provider candidate is replied, and thus availability of content delivery quality is not guaranteed and extendibility is relatively insufficient in the aspect of topology processing.

SUMMARY OF THE INVENTION

The present invention has been made in an effort to provide a method of request routing redirection with loop detection and prevention having advantages of guaranteeing high availability of content delivery quality in a case in which a plurality of content delivery networks (CDNs) are connected in various levels and topologies.

An exemplary embodiment of the present invention provides a method of request routing redirection. The method of request routing redirection includes: receiving, by a first content delivery network (CDN) among a plurality of CDNs connected by CDN interconnection (CDNi), a domain name system (DNS) request including a list of CDN-provider-identifications (IDs) of higher CDNs of the first CDN, from a user terminal; determining whether the request is processable; and when the request is not processable, redirecting the request, while preventing a loop of the request routing on the basis of the list.

The method may further include, when the request is processable, transmitting an IP address of a delivery node to the user terminal.

The method may further include, when a CDN-provider-ID of the first CDN is included in the list, stopping redirecting of the request routing.

The CDN-provider-IDs may each include a name of a CDN provider and a maximum number of redirection hops.

The method may further include, when the maximum number of redirection hops is 0, stopping redirecting of the request routing.

The name of the CDN provider may include an autonomous system number and a pair of additional identifiers.

The redirecting of the request may include: determining whether CDN-provider-IDs of lower CDNs of the first CDN are included in the list; when the CDN-provider-IDs of the lower CDNs are not included in the list, selecting a candidate CDN among the lower CDNs; and when CDN-provider-IDs of some of the lower CDNs are included in the list, selecting a candidate CDN among the remaining lower CDNs other than the some CDNs.

The redirecting of the request may further include delivering a name server (NS) record including the CDN-provider-ID of the first CDN, the CDN-provider-IDs of the higher CDNs, and a CDN-provider-ID of the candidate CDN, to the user terminal.

Another embodiment of the present invention provides a method of request routing redirection. The method of request routing redirection includes: receiving, by a first content delivery network (CDN) among a plurality of CDNs connected by CDN interconnection (CDNi), a domain name system (DNS) request including a list of CDN-provider-identifications (IDs) of higher CDNs of the first CDN, from a user terminal; returning an Internet protocol (IP) address of a request router of the first CDN to the user terminal; receiving a hypertext transfer protocol (HTTP) request from the user terminal; determining whether the HTTP request is processable; and when the HTTP request is not processable, redirecting the request, while preventing a loop of the request routing on the basis of the list.

The method may further include, when the request is processable, transmitting an IP address of a delivery node to the user terminal.

The method may further include, when a CDN-provider-ID of the first CDN is included in the list, stopping redirecting of the request routing.

The CDN-provider-IDs may each include a name of a CDN provider and a maximum number of redirection hops.

The method may further include, when the maximum number of redirection hops is 0, stopping redirecting of the request routing.

The name of the CDN provider may include an autonomous system number and a pair of additional identifiers.

The redirecting of the request may include: determining whether CDN-provider-IDs of lower CDNs of the first CDN are included in the list; when the CDN-provider-IDs of the lower CDNs are not included in the list, selecting a candidate CDN among the lower CDNs; and when CDN-provider-IDs of some of the lower CDNs are included in the list, selecting a candidate CDN among the remaining lower CDNs other than the some CDNs.

The redirecting of the request routing may include delivering an HTTP redirection message including a CDN domain of the candidate CDN, a CDN domain of the first CDN, CDN domains of the higher CDNs, and a CDN-provider-ID of the first CDN, to the user terminal.

Yet another embodiment of the present invention provides a method of request routing redirection.

The method of request routing redirection includes: delivering a domain name system (DNS) request including a list of CDN-provider-identifications (IDs) of higher content delivery networks (CDNs) of a first CDN to the first CDN, among a plurality of CDNs connected by CDN interconnection (CDNi); when the first CDN cannot process the request, receiving a DNS request further including CDN-provideridentifiers (ID) of candidate CDNs selected from lower CDNs of the first CDN in the list; and redirecting the request to a second CDN among the candidate CDNs.

The method may further include, when the connection to the second CDN fails, redirecting the request to a third CDN among the candidate CDNs.

The method may further include: receiving an address of an Internet protocol (IP) of a request router of the first CDN; and transmitting a hypertext transfer protocol (HTTP) request to the request router of the first CDN.

The method may further include, when the connection to the second CDN fails, redirecting the request to a third CDN among the candidate CDNs.

According to an exemplary embodiment of the present invention, since the request router of each CDN selects a plurality of CDNs as candidate CDNs and redirects request routing in the network in which a plurality of CDNs are connected in various topologies, both availability and extendibility of content delivery quality can be guaranteed. Also, the request router of each CDN can detect and prevent generation of a loop in redirecting request routing by using a CDN-provider-ID included in a message transmitted from an adjacent CDN.

DETAILED DESCRIPTION OF THE EMBODIMENTS

Figure 1:
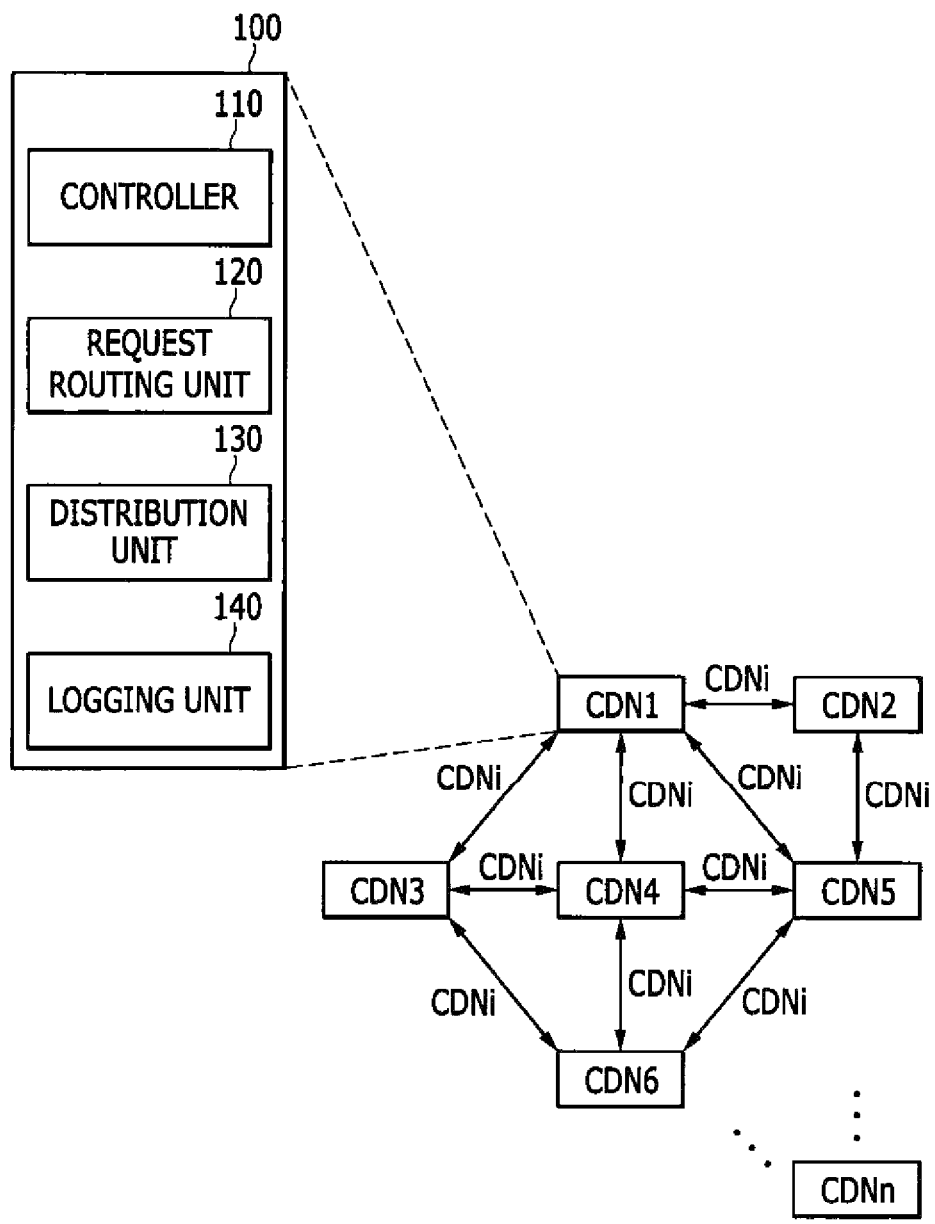
FIG. 1 is a view illustrating an environment in which content delivery networks (CDNs) are connected according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms such as "-er", "-or", and "module" described in the specification mean units for processing at least one function and operation, and can be implemented by hardware components or software components and combinations thereof.

FIG. 1 is a view illustrating an environment in which content delivery networks (CDNs) are connected according to an exemplary embodiment of the present invention.

Referring to FIG. 1, a plurality of CDNs 100 are connected through CDN interconnection (CDNi). An internal function module of each CDN provider includes a controller 110, a request routing unit 120, a distribution unit (or a distribution processor) 130, and a logging unit (or a logging processor) 140.

The controller 110 may perform a required initialization operation in the event of CDN interconnection, and request a command to be performed from a different CDN provider. For example, an upstream CDN (uCDN) provider may request a dCDN provider to retrieve particular content or metadata of particular content or to correct or delete contents (or substance) of particular content.

The request routing unit 120 may redirect a request message to a different CDN in a process of searching a CDN provider that may be able to process a client's request for content.

The distribution unit 130 may exchange metadata of content between CDNs.

The logging unit 140 may store relevant information produced in a process of delivering content, and deliver summary information of content. The summary information of content may be used for analyzing CDN performance and estimating a charge.

Hereinafter, an ID of a CDN provider (CDN-Provider-ID) according to an exemplary embodiment of the present invention will be described. A request router of each CDN may identify each CDN provider by using a CDN-Provider-ID in a process of redirecting request routing to multi-locations between CDNs. A CDN-Provider-ID may is composed of a name of a provider (ProviderName) and a maximum number of redirection hops (MaxNumRedHops).

The ProviderName includes an autonomous system (AS) number and a pair of additional identifiers. The pair of additional identifiers are identifiers that may be used for guaranteeing uniqueness in a case in which one or more CDN providers are included in the same AS number. For example, in a case in which the ProviderName of a CDN is 100:0, an AS number is 100 and only one CDN provider uses the AS number. Meanwhile, in a case in which the ProviderName of a CDN is 200:1, an AS number is 200, two CDN providers use the AS number, and the CDN corresponds to #1 among them.

MaxNumRedHops indicates a maximum allowed number of request routing redirections. The MaxNumRedHops value may be reduced by one each time request routing redirection occurs, and may be reduced until it reaches 0. In order to prevent the MaxNumRedHops value from being overused on purpose, an appropriate upper limit value thereof may be set, and the upper limit value may be determined through negotiation between CDN providers.

For example, in a case in which the CDN-Provider-ID of a CDN is 100:0:10, the ProviderName of the CDN is 100:0 and the MaxNumRedHops is 10. That is, in this case, a maximum allowed number of request routing redirections is 10.

In a case in which request routing redirections occur sequentially three times among CDNs (uCDN→dCDN1→dCDN2), when request routing redirections are performed in a hypertext transfer protocol (HTTP) manner, the dCDN1 delivers the CDN-Provider-ID to the dCDN2 through a uniform resource locator (URL) as shown below.

URL—"http://cdn.csp.com?uCDN-Provider-ID=100: 0&dCDN-Provider-ID=200:1&MaxNumRedHops=9"

Here, instead of repeatedly designating the MaxNumRedHops in every CDN-Provider-ID, the MaxNumRedHops is designated only once at the finish of the URL, thus saving space of a string of the URI. Such a CDN-Provider-ID delivery scheme according to an exemplary embodiment of the present invention may also be applied to a domain name system (DNS)-based request routing redirection, as well as to the HTTP-based request routing redirection. Here, in the case of the DNS-based request routing redirection, the CDN-Provider-ID may be included in a canonical name (CNAME) record and delivered.

Figure 2A:
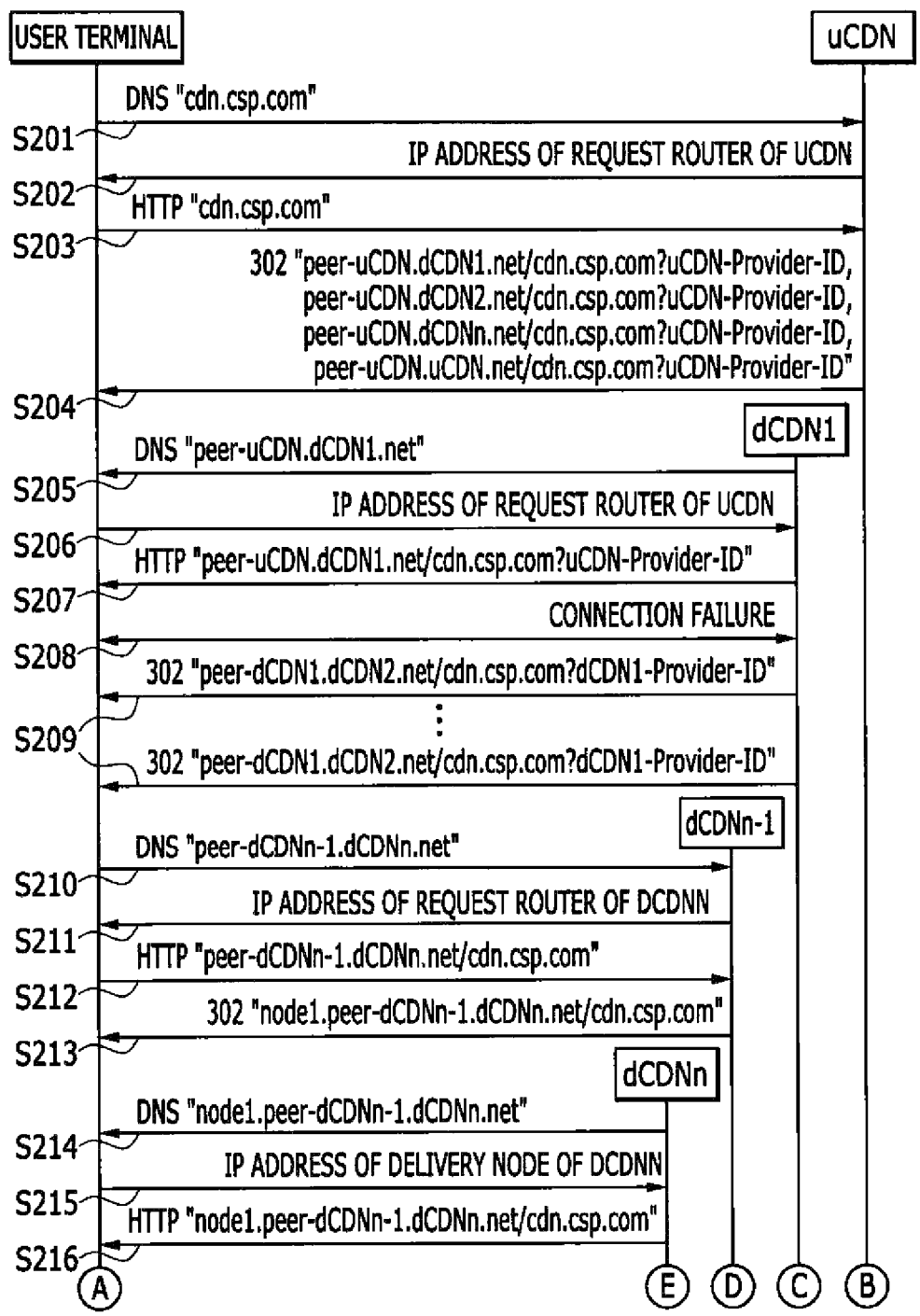
FIGS. 2A and 2B are views illustrating a method of HTTP-based request routing redirection through an iterative procedure according to an exemplary embodiment of the present invention.
Figure 2B:
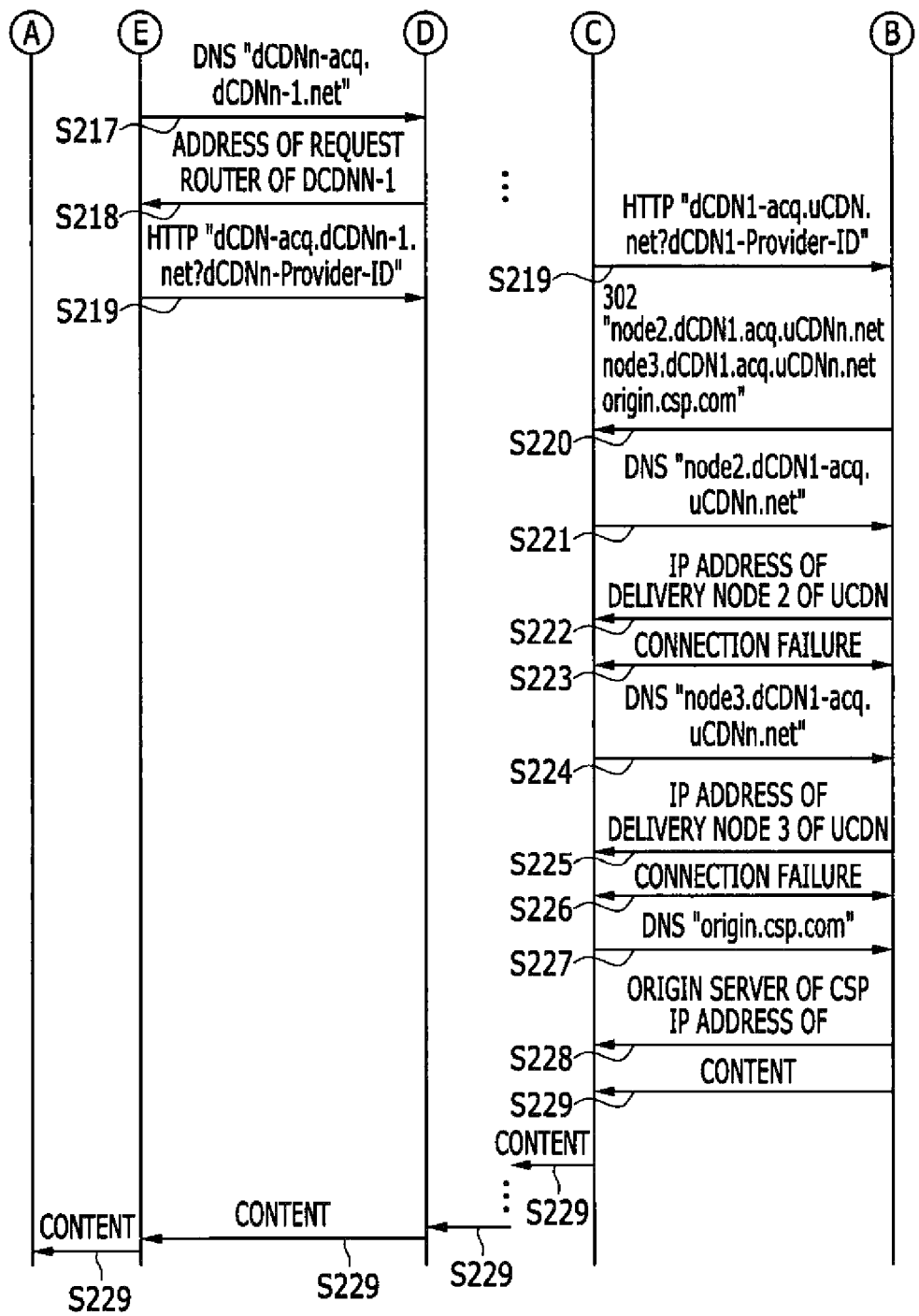

FIGS. 2A and 2B are views illustrating a method of HTTP-based request routing redirection through an iterative procedure according to an exemplary embodiment of the present invention.

In the method of HTTP-based request routing redirection through an iterative procedure according to an exemplary embodiment of the present invention, request routers of all of CDNs exchange a message with a user terminal. Also, in an exemplary embodiment of the present invention, uCDN is a CDN delivering request routing, and dCDN is a CDN receiving the request routing from the uCDN. Thus, in FIGS. 2A, 2B, 4, 5A, 5B, and 6, a single uCDN is shown, but in a case in which the dCDN1 should redirect request routing to the dCDN2, the dCDN1 becomes a uCDN and the dCDN2 becomes a dCDN, and in this case, the uCDN and the dCDN may be relatively determined among CDNs.

Referring to FIGS. 2A and 2B, a DNS resolver of a uCDN provider processes a DNS request delivered from a user terminal through "cdn.csp.com" as a CDN domain (S201). Thereafter, the DNS resolver returns an IP address of a request router module of the uCDN, as processing results, to the user terminal (S202).

Thereafter, when the user terminal delivers an HTTP request to the request router module of the uCDN through the "cdn.csp.com" as an HTTP domain (S203), the request router module of the uCDN determines that the dCDN1 is able to provide an optimal service to a user, and transmits an HTTP 302 redirection message as shown below (S204). In this case, the request router of the uCDN may also transmit the HTTP 302 redirection message to the dCDN2, dCDNn, and uCDN as candidates, besides the dCDN1.

302—"peer-uCDN.dCDN1.net/cdn.csp.com?uCDN-Provider-ID,
peer-uCDN.dCDN2.net/cdn.csp.com?uCDN-Provider-ID,
peer-uCDN.dCDNn.net/cdn.csp.com?uCDN-Provider-ID,
peer-uCDN.uCDN.net/cdn.csp.com?uCDN-Provider-ID"

The HTTP 302 redirection message is obtained by stacking "peer-uCDN.dCDN1.net, peer-uCDN.dCDN2.net, peer-uCDN.dCDNn.net, and peer-uCDN.uCDN.net" as CDN domains of the dCDN1, dCDN2, dCDNn, and uCDN on an existing URL, and including the CDN-Provider-ID of the uCDN in a URL query string. The reason for the request router of the uCDN to delivery the request routing to multi-locations through the HTTP 302 redirection message is to receive a reply from one or more candidate CDNs to guarantee availability of content delivery quality. Thereafter, the user terminal includes the message in a response HTTP message, without a correction, and delivers the same.

Thereafter, the user terminal performs DNS lookup by using the "peer-uCDN.dCDN1.net" as a CDN domain of the dCDN1 (S205). The DNS resolver of the dCDN1 delivers an IP address of the request router of the dCDN1 to the user terminal (S206).

Then, the user terminal delivers an HTTP request to the request router of the dCDN1 (S207). When a connection to the dCDN1 fails, the user terminal attempts connection to a different CDN described in the HTTP 302 redirection message received from the uCDN (S208).

Meanwhile, the request router of the dCDN1, which has received the HTTP request from the user terminal, may have two options. First, the request router of the dCDN1 may redirect the request routing to a different CDN provider. Second, the request router of the dCDN1 may directly deliver content in response to a content delivery request from the user terminal. According to an exemplary embodiment of the present invention, the request router of the dCDN1 may first perform a loop detection and prevention procedure by using the CDN-Provider-ID in both cases.

In the loop detection and prevention procedure according to an exemplary embodiment of the present invention, the request router checks a CDN-Provider-ID list. When an ID of the request router does not exist in the CDN-Provider-ID list, the request router determines that a loop has been generated. When the value of MaxNumRedHops is 0, the request router determines that request routing redirection can no longer be performed. The following algorithm shows an example of implementation of the loop detection and prevention procedure of the request router.

--- if (CDN-Provider-ID list contains nextProviderName)
{ //next CDN Provider will encounter loop thus choose another dCDN,
noneLoopdCDN
1) requestRedirect(nonLoopdCDN)
} else if (CDN-Provider-ID list contains my.ProviderName or
MaxNumRedHops <= 0)
{ //loop detected
2) request.deny( ); //most strict option
3)
if (my.Avail == true) {
request.DoService (mine);
} elseif (parent.Avail == true) { //if parent CDN is available
request.Redirect (parent);
} elseif (uCDN.Avail == true) { //if uCDN is available
request.Redirect (uCDN);
} elseif (dCDNAvail == true) { //if other dCDN is available
requestRedirect(dCDN);
} else { //no CDN is available to serve the request
request.deny( ); }

---

Figure 3:
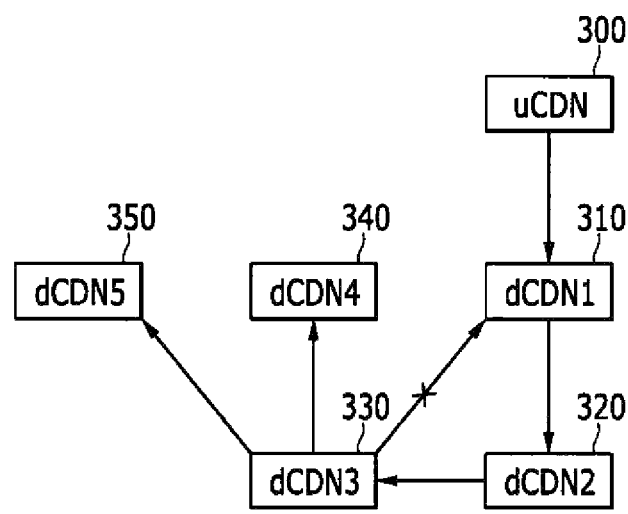
FIG. 3 is a view illustrating downstream CDNs (dCDNs) performing loop detection and prevention according to an exemplary embodiment of the present invention.

FIG. 3 is a view illustrating CDNs performing loop detection and prevention according to an exemplary embodiment of the present invention.

In an exemplary embodiment of the present invention, a request router of each CDN detects a loop through the foregoing loop detection and prevention algorithm, and determines a dCDN to redirect request routing in order to prevent a loop. Referring to FIG. 3, when the dCDN3 330, upon receiving request routing redirection from the dCDN2 320, redirects request routing, it refers to the CDN-Provider-ID list. Since a CDN-Provider-ID of the dCDN3 330 does not exist in the CDN-Provider-ID list, the dCDN3 330 determines that a loop has not yet been generated. In redirecting request routing, the dCDN3 330 does not redirect request routing to the dCDN2 320 as a parent CDN, and since a CDN-Provider-ID of the dCDN1 310 is included in the CDN-Provider-ID list, the dCDN3 330 also does not redirect request routing to the dCDN1 310. Thus, the dCDN3 redirects request routing to the dCDN4 340 or the dCDN5 350.

Referring back to FIGS. 2A and 2B, the request router of the dCDN1 310 determines that a loop has not yet been generated because its CDN-Provider-ID is not included in the CDN-Provider-ID list.

The loop detection and prevention algorithm according to an exemplary embodiment of the present invention may support both measures in a case in which a loop is detected and after a loop is detected. That is, upon determining whether a CDN-Provider-ID of the request router is included in the CDN-Provider-ID list, the request router may determine whether a loop has been generated, and when a loop is detected, the request router may terminate redirection of request routing. In this case, the loop detection and prevention algorithm may be applied to both a process of request routing redirection and a process of obtaining content between CDN providers.

Meanwhile, upon checking the CDN-Provider-ID list, when the request router determines that it is not an appropriate CDN for delivering content to the user terminal, the request router continues to redirect request routing. That is, the request router selects a dCDN provider for redirecting request routing, and transmits an HTTP redirection message including the CDN-Provider-ID thereof added thereto to the user terminal. According to an exemplary embodiment of the present invention, when the request router transmits the HTTP redirection message to the user terminal, each request router may select a plurality of CDNs (multi-locations). In this case, a criterion for selecting CDNs may be determined among respective CDN providers, and may vary according to a CDN operation policy.

In this case, a dCDN provider that may be able to perform a service may be selected, or a higher step is repeated until the value of MaxNumRedHops becomes 0. Alternatively, the request router may process request routing according to a policy of its own. In this case, the request router selects an appropriate content delivery server and transmits an HTTP 302 redirection message including an address of the server to the user terminal (S209).

Thereafter, when a dCDN provider that may able to perform a service or when a content delivery server is selected according to a policy of its own and a dCDNn which is able to process a request from the user terminal is determined, the user terminal performs DNS lookup by using "peer-dCDNn-1.dCDNn.net" as a CDN domain of the dCDNn (S210). Thereafter, the DNS resolver returns an IP address of a request router of the dCDNn to the user terminal (S211).

Thereafter, when the request router of the dCDNn receives an HTTP request from the user terminal (S212), it selects a delivery node that may be able to provide the client's request. Thereafter, the request router of the dCDNn delivers an HTTP 302 redirection message for replacing a CDN domain of the selected delivery node with a sub-domain to the user terminal (S213).

The user terminal performs DNS lookup by using "node1.peer-dCDNn-1.dCDNn.net" as the sub-domain of the delivery node (S214). Thereafter, the DNS resolver of the dCDNn returns an IP address of the delivery node to the user terminal (S215).

Then, the user terminal requests content from the delivery node of the dCDNn (S216). When content requested by the client exists in a cache server of the delivery node, the delivery node directly transmits the content to the user terminal.

However, when the cache server does not have the content (cache miss), the delivery node fetches the content from a uCDN or a higher dCDN and delivers the content to the user terminal. In this case, the user terminal may receive the content from the dCDNn by using "peer-dCDNn-1.dCDNn.net" as a CDN domain.

Thereafter, the delivery node of the dCDNn sends a DNS request to a dCDNn-1 (S217), and a resolver of the dCDNn-1 processes the DNS request and returns an IP address of the request router of the dCDNn-1 to the delivery node of the dCDNn (S218).

The request router of the dCDNn-1 processes the HTTP request received from the delivery node of the dCDNn (S219). The request router of the dCDNn-1 recognizes that the HTTP request has come from an adjacent CDN provider through the "dCDNn-qcq.dCDNn-1.net" as a reliable inter-CDN domain.

In a procedure in which the delivery node fetches content from a different dCDN, the request router of each dCDN redirects request routing to multi-locations and checks whether content exists in a cache of each CDN. The request router of each dCDN performs a loop detection and prevention procedure on the basis of the delivered CDN-Provider-ID. The loop detection and prevention procedure may be continuously performed until a CDN provider that may be able to provide content according to availability of content is determined or until the value of MaxNumRedHops indicating a level of redirection becomes 0.

If content cannot be found from a cache server of any dCDN positioned between the user terminal and a uCDN, the request router of the uCDN selects a second delivery node appropriate for content delivery, and returns a 302 redirection message including information regarding a subdomain of the selected delivery node (S220).

In this case, the 302 redirection message may be delivered as follows.

302—"node2.dCDN1.acq.uCDNn.net,
node3.dCDN1.acq.uCDNn.net,
origin.csp.com"

Thereafter, a DNS resolver of the uCDN processes the DNS request (S221), and returns an IP address of the delivery node of the uCDN (S222, S225). Here, a connection may fail between each delivery node and the dCDN1 (S223, S226), and in this case, the dCDN1 is connected to a next delivery node described in the 302 redirection message delivered in operation S220.

Meanwhile, when a cache miss occurs in every delivery node, the dCDN1 may be finally connected to an origin server of a csp (S227), and the origin server included in the uCDN may deliver the content to the user terminal by way of the dCDN (S228, S229).

Figure 4:
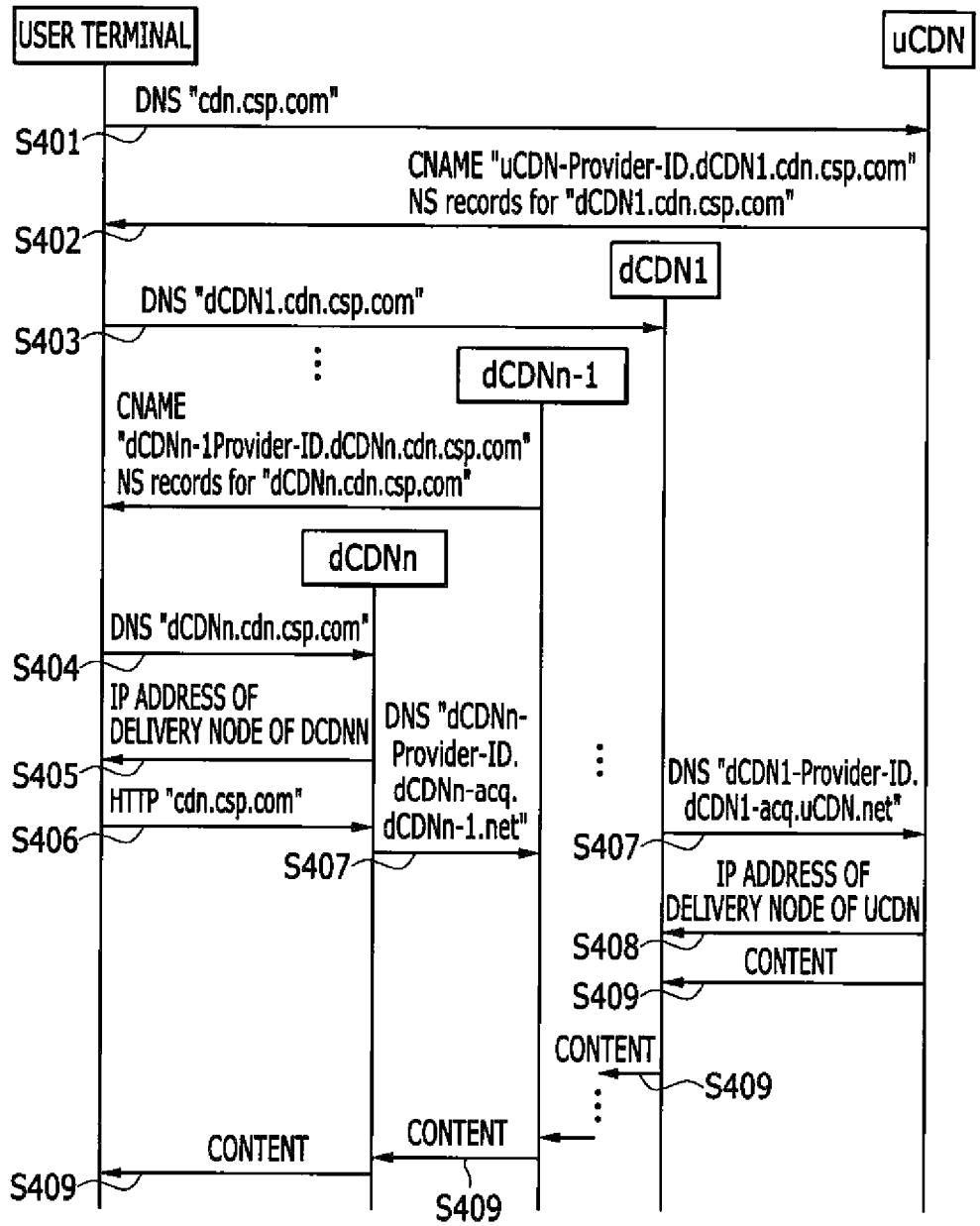
FIG. 4 is a view illustrating a method of DNS-based request routing redirection through the iterative procedure according to an exemplary embodiment of the present invention.

FIG. 4 is a view illustrating a method of DNS-based request routing redirection through the iterative procedure according to an exemplary embodiment of the present invention.

The request router of the uCDN processes the DNS request delivered from the user terminal on the basis of cdn.csp.com as a CDN domain (S401). In this process, the request router of the uCDN recognizes that a different CDN provider is appropriate for processing the client's content request. Thus, the request router of the uCDN returns CNAME obtained by adding an ID (Identification) of the dCDN1 and the CDN-Provider-ID of the uCDN to the original CDN domain to the user terminal. Also, simultaneously, the request router of the uCDN returns a name server (NS) record obtained by mapping dCDN1.cdn.csp.com to the request router of the dCDN1 (S402). Here, even in the DNS-based redirection, multi-location processing may be performed, like the case of HTTP, as illustrated in FIG. 3. That is, the uCDN may select a plurality of candidate CDNs, include CDN-Provider-IDs and URLs of the plurality of candidate CDNs in an NS record, and redirect request routing.

The user terminal performs DNS look-up by using dCDN1.cdn.csp.com as a corrected CDN domain (S403). The request router of the dCDN1 determines whether to directly process the client's content request or whether to redirect it, and checks whether a loop is generated in the redirection.

Thereafter, messages are repeatedly transmitted and received between the user terminal and the dCDN until a dCDN that may be able to process the request is determined or until MaxNumRedHops becomes 0. In an exemplary embodiment of the present invention, a case in which the dCDNn is determined to be a CDN for process the client's request will be described.

The user terminal performs DNS look-up by using dCDNn.cdn.csp.com as a corrected CDN domain (S404), and the request router of the dCDNn returns an IP of an appropriate delivery node to the user terminal (S405).

The user terminal requests content from the delivery node of the dCDNn (S406). Here, when the content exists in a cache server of the delivery node, the content is directly delivered from the delivery node to the user terminal.

However, when the content does not exist in the cache server of the delivery node, the dCDNn obtains the content from a higher parent dCDN or uCDN and delivers the same to the user terminal. Here, the request router of each CDN performs loop detection and prevention procedure on the basis of the CDN-Provider-ID.

Thereafter, a process of searching a CDN provider that may be able to provide content is continuously performed until the value of MaxNumRedHops becomes 0 or until a CDN provider that may be able to provide content is determined according to a repetition number of redirections and availability of content (S407).

Thereafter, when the content cannot be found in the cache server of every dCDN positioned between the user terminal and the uCDN, the uCDN is determined to be a content delivery CDN provider. The request router of the uCDN selects an appropriate delivery node and returns an IP of the selected delivery node (S408). The uCDN delivers the requested content to the user terminal through the dCDN (S409).

Figure 5A:
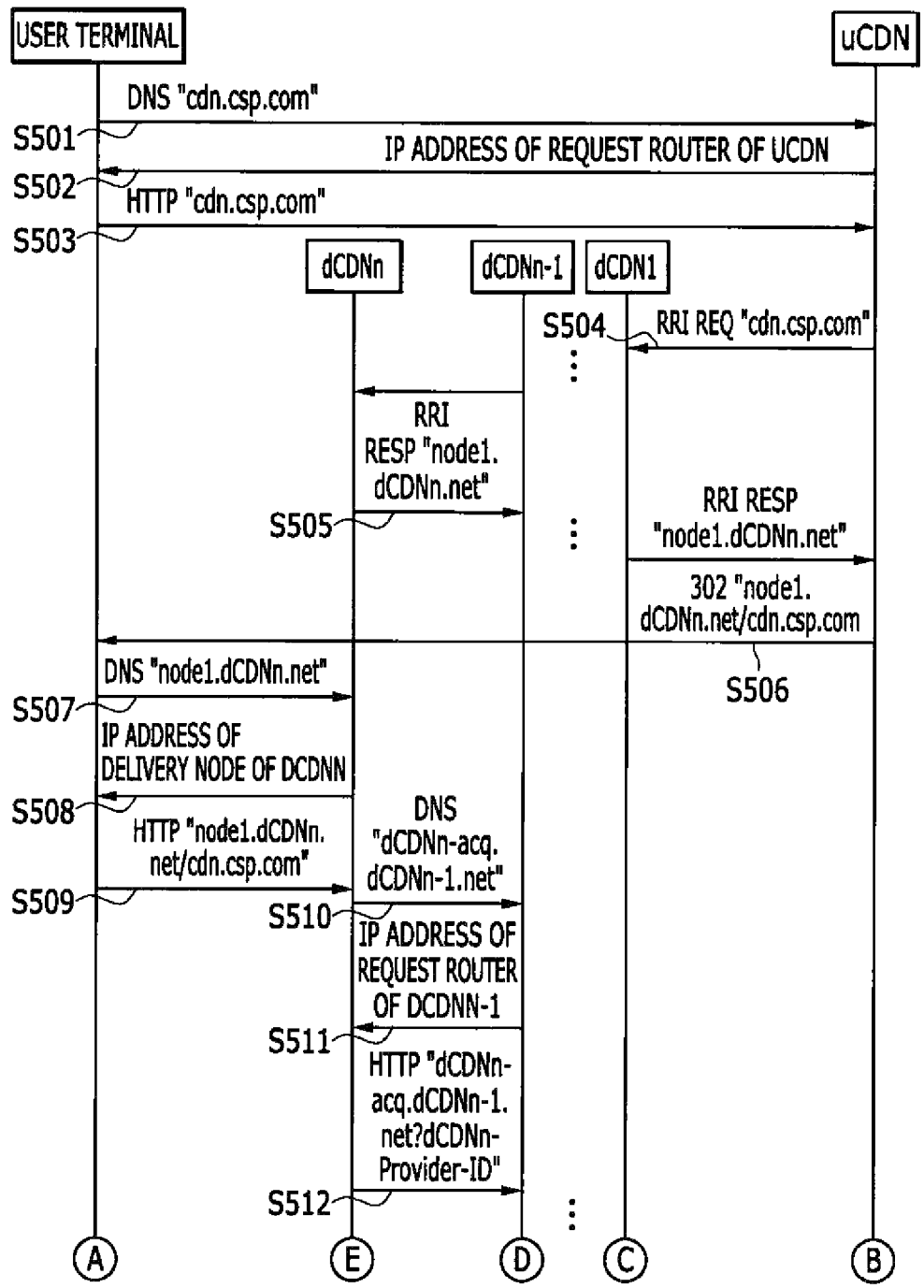
FIGS. 5A and 5B are views illustrating a method of HTTP-based request routing redirection through a recursive procedure according to an exemplary embodiment of the present invention.
Figure 5B:
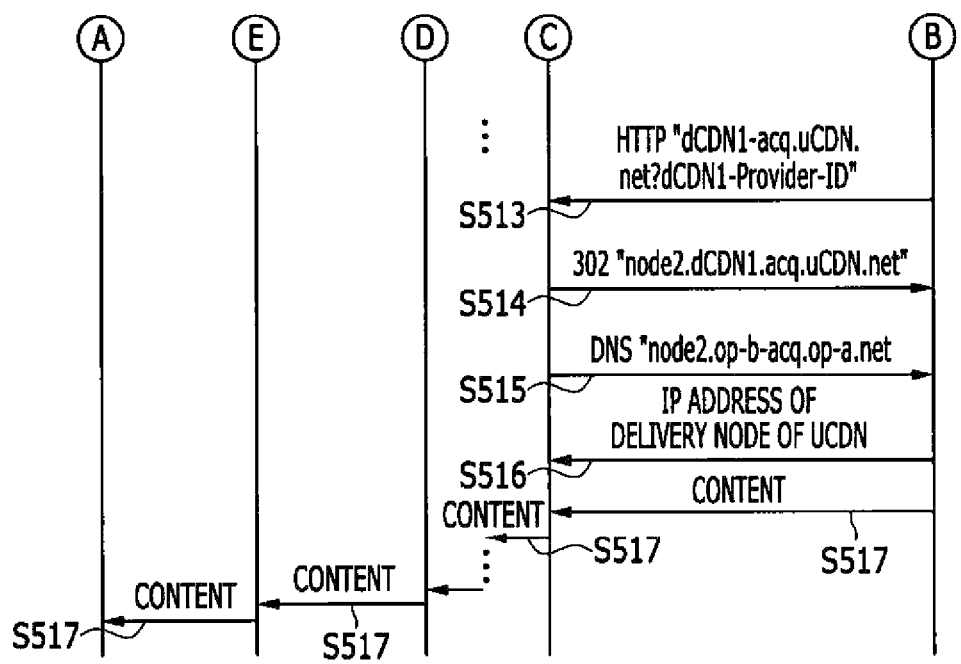

FIGS. 5A and 5B are views illustrating a method of HTTP-based request routing redirection through a recursive procedure according to an exemplary embodiment of the present invention.

The DNS resolver of the uCDN processes a DNS request delivered from the user terminal on the basis of "cdn.csp.com" as a CDN domain (S501). The DNS resolver of the uCDN returns an IP address of a request router of the uCDN provider, as a processing result (S502).

In the case of the method of HTTP-based request routing redirection using the recursive procedure according to an exemplary embodiment of the present invention, once the user terminal delivers an HTTP request to the request router of the uCDN, the uCDN subsequently detects an optimal dCDN provider through communication with a plurality of dCDN providers and delivers the same to the user terminal.

That is, while processing the HTTP request (S503), the request router of the uCDN determines that the dCDN1 will best serve the user terminal's request, and sends a request routing interface (RRI) REQ message including required information such as a URL of the requested content to the dCDN1 through the RRI of the dCDN1 (S504). Here, the request router of the uCDN provides the CDN-Provider-ID of the uCDN for loop detection and prevention. In a case in which request routing is redirected in a multi-location manner, CDN-Provider-IDs of a plurality of CDN providers selected by the uCDN are also provided.

When the dCDN1 discovers a loop, it processes the loop according to the foregoing algorithm. When there is no loop, the dCDN1 sends a name of the DNS of the delivery node to the user terminal or redirects request routing to a different dCDN. Such request routing redirection may be continuously performed until a CDN that may be able to provide a service with respect to the client's content request is determined. Thus, an RRI RESP message may be transmitted in the opposite direction of redirection or may be directly delivered to the CDN provider as a starting point of redirection. Contact information may be included in an RRI REQ message, or may be set in advance during a bootstrapping process (S505).

Thereafter, the request router of the uCDN returns the 302 redirection message that is redirected to a new URL (S506).

The user terminal performs DNS look-up on the basis of a name of a host of the received URL (node1.dCDNn.net) (S507). The DNS resolver of the dCDNn returns an IP address of the corresponding delivery node to the user terminal (S508). Here, since the user terminal has received the name of the delivery node from the dCDNn through the CDN request routing interface, an additional redirection is not generated. The request router of the dCDNn may redirect an HTTP request from the user terminal to a different dCDN or may directly process it. In the case in which the request router of the dCDNn redirects the HTTP request, the request router may select a new dCDN provider and sends an HTTP redirection message including the CDN-Provider-ID thereof to the selected dCDN provider. However, when the dCDN1 directly processes the HTTP request, the dCDN1 selects an appropriate content delivery server and sends an HTTP 302 redirection message including an address of the selected server to the user terminal.

Thereafter, the user terminal requests content from the delivery node of the dCDNn (S509). When the requested content exists in the cache server of the delivery node of the dCDNn, the content may be directly transmitted to the user terminal from the delivery node.

However, when the requested content does not exist in the cache server of the delivery node of the dCDNn, the dCDNn should fetch content from the uCDN or a higher dCDN. The request router of each dCDN may redirect the request routing to multi-locations to check whether the content exists in the cache of each CDN.

Here, "dCDNn.net" as a CDN domain means that the content should be fetched from the dCDNn-1. When the CDN domain of each dCDN is stripped off, it may be recognized that the CDN domain belongs to cdn.csp.com. The dCDNn checks that the CDN domain is an already known CDN provider. In an exemplary embodiment of the present invention, the dCDNn requests the content from the dCDNn-1 through "dCDNn-acq.dCDNn-1.net" (S510).

The DNS resolver of the dCDNn-1 processes the DNS request and returns an IP address of the request router of the dCDNn-1 (S511).

Thereafter, the request router of the dCDNn-1 receives the HTTP request from the delivery node of the dCDNn and processes the received HTTP request (S512). The request router of the dCDNn-1 may recognize that the content request has come from an adjacent CDN, rather than from the user terminal, through the "dCDNn-acq.dCDNn-1.net" as a domain obtained from designated CDN domains. The request router of the dCDNn-1 performs a loop detection and prevention process on the basis of the CDN-Provider-ID. Thereafter, the request for acquiring content is recursively made until the value of MaxNumRedHops becomes 0 or until a CDN provider for providing content is selected according to a repetition number of redirections and availability of content.

Thereafter, when the content cannot be found in the cache server of any dCDN positioned between the user terminal and the uCDN, the uCDN is determined to be a CDN provider for delivering content (S513). The request router of the uCDN selects an appropriate delivery node that may be able to process the request for acquiring content among CDN domains, and transmits an HTTP 302 redirection message including the replaced subdomain (of a domain obtained from among designated CDNs of the uCDN) indicating the selected delivery node to the user terminal (S514).

Over the DNS request from the user terminal, the DNS resolver of the uCDN processes the DNS request (S515) and returns an IP address of the delivery node of the uCDN (S510). Thereafter, the uCDN provides the content to the user terminal through the dCDN from the requested CDN domain (S517).

Figure 6:
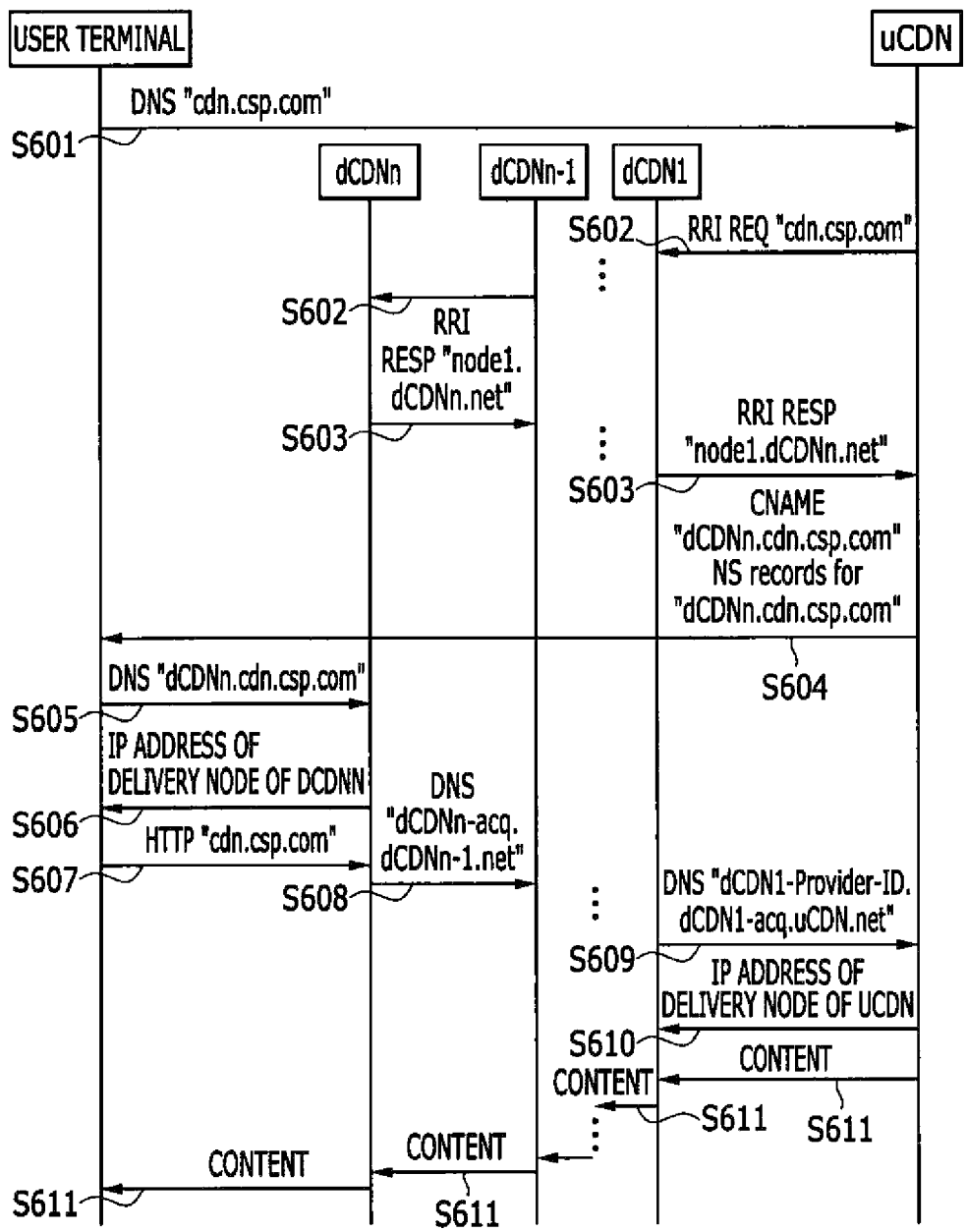
FIG. 6 is a view illustrating a method of DNS-based request routing redirection through the recursive procedure according to an exemplary embodiment of the present invention.

FIG. 6 is a view illustrating a method of DNS-based request routing redirection through the recursive procedure according to an exemplary embodiment of the present invention.

First, the request router of the uCDN processes a DNS request delivered from the user terminal on the basis of "cdn.csp.com" as a CDN domain (S601). In this process, the request router of the uCDN determines that the dCDN1 can best process the client's content request. Thus, the request router of the uCDN redirects the request routing to the dCDN1 through a request routing interface of the dCDN1. Here, the request router of the uCDN also provides information including a URL and CDN-Provider-ID of the uCDN (S602). Also, the request router of the uCDN may use a multi-location scheme, like the case of HTTP. In a case in which the request router of the uCDN redirects the request routing according to the multi-location scheme, it may include a plurality of CDN candidates selected by the uCDN in an NS record and transmit the same.

The request router of the dCDN1 executes a loop detection and prevention algorithm through the CDN-Provider-ID list. Without a loop, the dCDN1 returns a name of the DNS of an appropriate delivery node or redirects the request routing to a different dCDN. In the case in which the dCDN1 redirects the request routing, the request routing may be continuously redirected between dCDNs until a dCDN that may be able to provide content to the user terminal is selected. An RRI RESP message may be delivered in reverse order of the redirection process or may be directly delivered to the initial CDN provider that started the redirection. Here, information regarding a connection to the initial CDN provider may be included in an RRI request message or may be determined in advance during an initialization process. In an exemplary embodiment of the present invention, the case in which the dCDNn is determined to be a content providing dCDN will be described (S603).

Thereafter, the request router of the uCDN returns CNAME in which the designated CDN domain ID of the dCDNn and the CDN-provider-ID of the uCDN are added to the CDN domain and NS records in which "dCDN1.csp.com" is mapped to the request router of the dCDN1, to the user terminal (S604). When a multi-location option is selected, the request router of the uCDN includes a CDN-provider-ID of a selected candidate CDN therein and returns the same.

The user terminal performs DNS look-up on the basis of the corrected CDN domain "dCDNn.cdn.csp.com" (S605), and the request router of the dCDNn returns an IP address of an appropriate delivery node to the user terminal (S606).

Thereafter, the user terminal requests content from the delivery node of the dCDNn (S607). Here, when the content is stored in the cache server of the dCDNn, the content is directly delivered from the delivery not to the user terminal. However, the content is not stored in the cache server, the dCDNn obtains the content from the uCDN or a different dCDN and delivers the obtained content to the user terminal. Also, in this case, each request router performs a loop detection and prevention procedure on the basis of the CDN-provider-ID. The process of finding the content among the dCDN is repeated until a CDN provider that may be able, to provide the content requested by the client is determined or until MaxNumRedHops indicating the repetition number of redirections becomes 0 (S608).

Here, when cache miss occurs in every dCDN, the uCDN is determined to be a CDN provider for content delivery (S609). The request router of the uCDN selects an appropriate delivery node and returns an IP address of the delivery node (S610). Thereafter, the uCDN may deliver content to the user terminal by way of a dCDN (S611). In this case, the content is redirected among dCDNs in reverse order of the path along which the request routing has been redirected.

As described above, according to an exemplary embodiment of the present invention, since the request router of each CDN selects a plurality of CDNs as candidate CDNs and redirects request routing in the network in which a plurality of CDNs are connected in various topologies, both availability and extendibility of content delivery quality can be guaranteed. Also, the request router of each CDN can prevent generation of a loop in redirecting request routing by using a CDN-provider-ID included in a message transmitted from an adjacent CDN.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A computer implemented method of request routing redirection, comprising;
   receiving, from a user terminal, a domain name system (DNS) request among a plurality of CDNs connected by CDN interconnection (CDNi), the request including a list of CDN-provider-identifications (IDs) of higher CDNs of a first content delivery network (CDN);
   determining, by a processor, whether the request is processable for routing; and
   in response to detection the request is not processable, redirecting the request, while preventing a loop of request routing according to the list.

2. The method of claim 1, further comprising, in response to detection the request is processable, transmitting an IP address of a delivery node to the user terminal.

3. The method of claim 1, further comprising, in response to detection a CDN-provider-ID of the first CDN is included in the list, stopping redirecting of the request routing.

4. The method of claim 1, wherein each of the CDN-provider-IDs comprises a name of a CDN provider and a maximum number of redirection hops.

5. The method of claim 4, further comprising, in response to detection the maximum number of redirection hops is 0, stopping redirecting of the request routing.

6. The method of claim 4, wherein the name of the CDN provider comprises an autonomous system number and a pair of additional identifiers.

7. The method of claim 1, wherein the redirecting the request comprises:
- determining, by the processor, whether CDN-provider-IDs of lower CDNs of the first CDN are included in the list;
- in response to detection the CDN-provider-IDs of the lower CDNs are not included in the list, selecting a candidate CDN among the lower CDNs; and
- in response to detection CDN-provider-IDs of first lower CDNs are included in the list, selecting a candidate CDN among the remaining lower CDNs other than the first CDNs.

8. The method of claim 7, wherein the redirecting of the request further comprises
- delivering a name server (NS) record including the CDN-provider-ID of the first CDN, the CDN-provider-IDs of the higher CDNs, and a CDN-provider-ID of the candidate CDN, to the user terminal.

9. A computer implemented method of request routing redirection comprising:
- receiving, from a user terminal, a domain name system (DNS) request among a plurality of CDNs connected by CDN interconnection (CDNi), the request including a list of CDN-provider-identifications (IDs) of higher CDNs of a first content delivery network (CDN);
- returning an Internet protocol (IP) address of a request router of the first CDN to the user terminal;
- receiving a hypertext transfer protocol (HTTP) request from the user terminal;
- determining, by a processor, whether the HTTP request is processable for routing; and
- in response to detection the HTTP request is not processable, redirecting the request, while preventing a loop of the request routing according to the list.

10. The method of claim 9, wherein in response to detection the request is processable, transmitting an IP address of a delivery node to the user terminal.

11. The method of claim 9, wherein in response to detection a CDN-provider-ID of the first CDN is included in the list, stopping redirecting of the request routing.

12. The method of claim 9, wherein the CDN-provider-IDs each comprise a name of a CDN provider and a maximum number of redirection hops.

13. The method of claim 12, wherein in response to detection the maximum number of redirection hops is 0, stopping redirecting of the request routing.

14. The method of claim 12, wherein the name of the CDN provider comprises an autonomous system number and a pair of additional identifiers.

15. The method of claim 9, wherein the redirecting of the request comprises:
- determining, by the processor whether CDN-provider-IDs of lower CDNs of the first CDN are included in the list;
- in response to detection the CDN-provider-IDs of the lower CDNs are not included in the list, selecting a candidate CDN among the lower CDNs; and
- in response to detection CDN-provider-IDs of first lower CDNs are included in the list, selecting a candidate CDN among the remaining lower CDNs other than the first CDNs.

16. The method of claim 15, wherein the redirecting of the request comprises:
- delivering an HTTP redirection message including a CDN domain of the candidate CDN, a CDN domain of the first CDN, CDN domains of the higher CDNs, and a CDN-provider-ID of the first CDN, to the user terminal.

17. A computer implemented method of request routing redirection, comprising:
- delivering a domain name system (DNS) request including a list of CDN-provider-identifications (IDs) of higher content delivery networks (CDNs) of a first CDN to the first CDN, among a plurality of CDNs connected by CDN interconnection (CDNi);
- in response to determination, by a processor, the first CDN cannot process the request, receiving a DNS request further including CDN-provider-identifiers (ID) of candidate CDNs selected from lower CDNs of the first CDN in the list; and
- redirecting the request to a second CDN among the candidate CDNs.

18. The method of claim 17, further comprising,
- in response to detection the connection to the second CDN fails, redirecting the request to a third CDN among the candidate CDNs.

19. The method of claim 17, further comprising:
- receiving an address of an Internet protocol (IP) of a request router of the first CDN; and
- transmitting a hypertext transfer protocol (HTTP) request to the request router of the first CDN.

20. The method of claim 19, further comprising, response to detection the connection to the second CDN fails, redirecting the request to a third CDN among the candidate CDNs.

* * * * *